United States Patent [19]

Farrag

[11] Patent Number: 5,513,445
[45] Date of Patent: May 7, 1996

[54] METHOD OF OPERATING A DRIER FOR POWDERED, GRANULATED AND POURABLE MATERIALS AND A DRIER OPERATING IN ACCORDANCE WITH THE METHOD

[75] Inventor: El-Taher Farrag, Höchst/Vlbg., Austria

[73] Assignee: Fasti Farrag & Stipsits GmbH, Bregenz, Austria

[21] Appl. No.: 302,755

[22] PCT Filed: Jan. 12, 1994

[86] PCT No.: PCT/EP94/00076

§ 371 Date: Sep. 13, 1994

§ 102(e) Date: Sep. 13, 1994

[87] PCT Pub. No.: WO94/15764

PCT Pub. Date: Jul. 21, 1994

[30] Foreign Application Priority Data

Jan. 13, 1993 [DE] Germany ............... 43 00 595.0

[51] Int. Cl.[6] ...................................... F26B 3/08
[52] U.S. Cl. ................... 34/362; 34/363; 34/582; 34/592
[58] Field of Search ............... 34/582, 583, 592, 34/362, 363, 371

[56] References Cited

U.S. PATENT DOCUMENTS 2,607,666  8/1952  Martin ........................... 34/582
4,578,879  4/1986  Yokoyama et al. ............. 34/582
4,636,084  1/1987  Kopernicky .
5,316,735  5/1994  Ivanov et al. ................... 34/582
5,422,080  6/1995  Sinn et al. ....................... 34/582

FOREIGN PATENT DOCUMENTS 0122886  10/1984  European Pat. Off. .
4080005   3/1992  Japan .
1730519   4/1992  U.S.S.R. ......................... 34/582
 834455   5/1990  United Kingdom .............. 34/583
2232632  12/1990  United Kingdom .

OTHER PUBLICATIONS

Kunststoffe, vol. 73, No. 4, Apr., 1983, p. 189, "Abwärmenutzung Zur Materialtrocknung", Engelmann & Buckham Ancilleries Ltd.

Primary Examiner—John T. Kwon
Attorney, Agent, or Firm—Spencer & Frank

[57] ABSTRACT

A process and device for operating a drier for at least one of powdered, granulated and pourable materials. During operation of the drier, a drying air current is introduced into a drier and rises through the material to be dried, thus removing moisture therefrom. To reduce the costs of generating a drying air current, the drying air current is drawn from the outlet of a blow molding, stretch-blow forming or other plastic molding process.

14 Claims, 1 Drawing Sheet

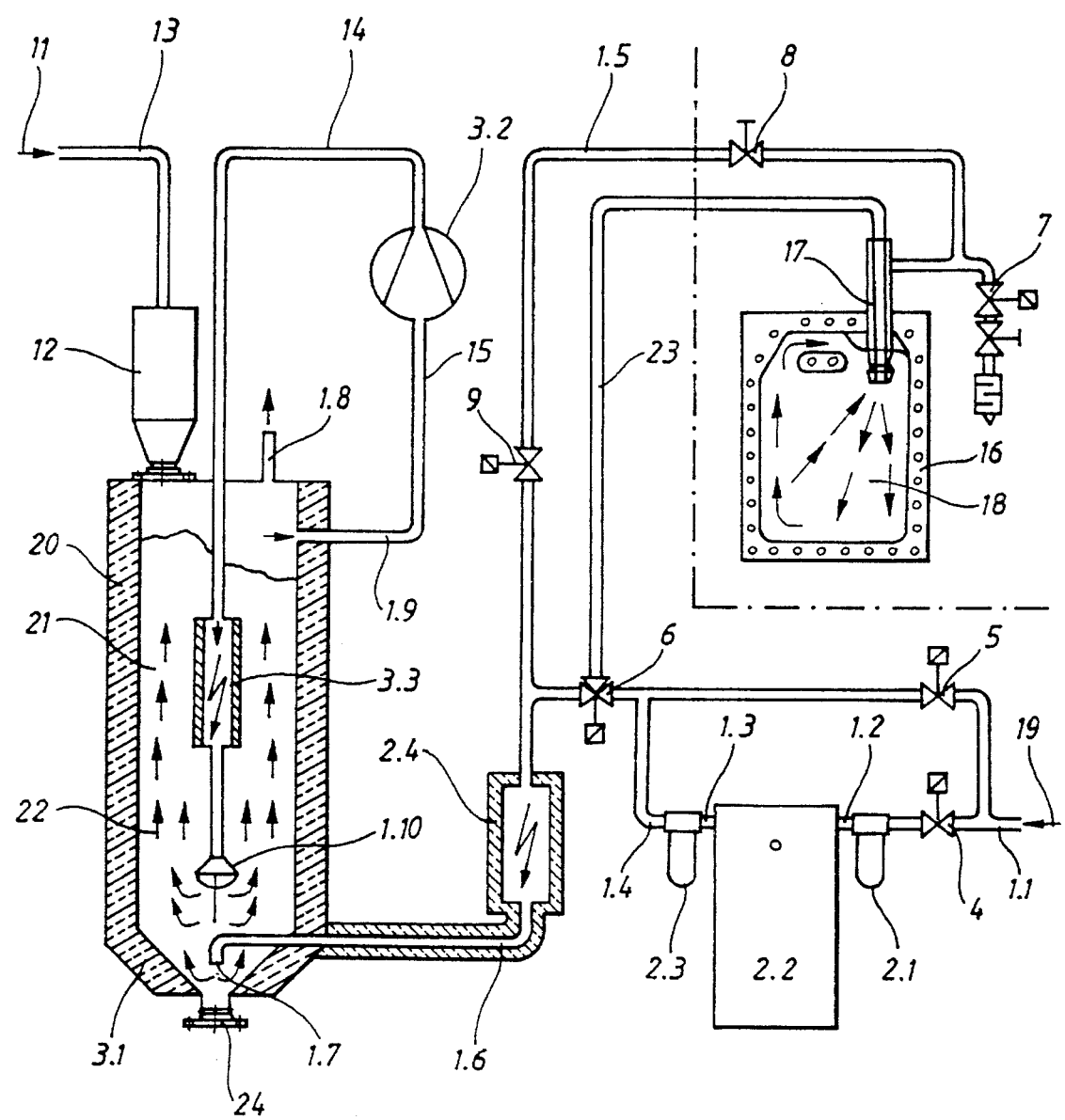

METHOD OF OPERATING A DRIER FOR POWDERED, GRANULATED AND POURABLE MATERIALS AND A DRIER OPERATING IN ACCORDANCE WITH THE METHOD

FIELD OF THE INVENTION

The subject of the invention is a method of operating a drier for at least one of powdered, granulated and pourable materials, and a drier operating in accordance with the method.

BACKGROUND OF THE INVENTION

Driers of this type are used, for example, preferably, in the plastics industry in order to dry granulates, as is necessary for the production of plastic bodies in blow-molding methods. It is known to pour the granulate to be dried into a funnel-shaped drier and conduct a current of drying air into the floor region of the drier, which current subsequently rises and removes the moisture from the granulate, and the dry air then escapes through a discharge opening on the top side.

The known drier is operated in circulating air operation. Accordingly, a current of dry compressed air is introduced into the line upstream of a fan, this compressed-air current expanding in the fan and being conducted upstream into the floor region of the drier through this fan via one or a plurality of outlet nozzles.

A disadvantage of the known method and the drier operating in accordance therewith is that a continuous compressed-air current must be made available, which is machine-intensive. This compressed-air current must be filtered, de-oiled and appropriately heated in order to achieve favorable conditioning of the drying air.

A further disadvantage is the relatively machine-intensive requirement for circulating the drying air in the drier in the circulating-air operation. Corresponding lines are necessary for this, as is a suitable fan, in order to assure a constant throughput in circulation through the drier.

A further disadvantage is that the compressed-air current, which is introduced upstream of the fan, cannot be guided and conditioned separately from the drying-air current.

Thus, the disadvantage arises that no separate air current can be fed into the drier, which is advantageous in many drying jobs.

Therefore, it is the object of the invention to modify a method and a drier operating in accordance with the method such that improved drying of the material to be dried is assured with low machine intensity.

SUMMARY OF THE INVENTION

The above object is accomplished by the invention, according to which a drying air current is drawn from the outlet of a plastic molding device, such as a blow-molding device, and thereafter introduced into a drier containing the material to be dried such that the drying air current passes through the material to be dried and removes moisture therefrom.

An essential feature of the invention is that the method according to the invention operates with a drying-air current, which is obtained at the outlet (upstream) of a blow-molding process; associated with this method is the advantage that this drying-air current is dried to a relatively low dew point, that it is already completely conditioned (filtered and de-oiled), and that this drying-air current, which would otherwise have to escape needlessly into the open air, is now fed into the granulate drier.

The term drying air is hereinafter intended to mean the air current which is introduced into the granulate drier. With respect to the blow-molding process, this drying air is, however, to be designated as scavenging air, because according to the invention the scavenging air from the blow-molding process is to be used for introduction into the granulate drier.

Hence, a plurality of advantages are simultaneously achieved. A scavenging-air current that would otherwise be conducted needlessly into the open air is used as a drying-air current for the granulate drier, so that the drier need not have its own separate compressed-air current made available, as has been done in the prior art. Therefore, the method according to the invention is not very machine-intensive, because only one corresponding line connection need be produced from the outlet of the blow-molding process to the granulate drier according to this method.

In accordance with the invention, therefore, the scavenging air resulting during the blowing process is used as a drying means to dry such granulates in a granulate drier.

The term "granulate" is not to be understood as being limiting because, according to the invention, it includes all materials which are to be dried in a manner known per se in this type of drier, i.e. powdered, granulated, or fibrous materials.

A further advantage of the method according to the invention is that, following the exit of the scavenging air from the blow-molding process to be used as drying air it can be preheated in order to introduce drying air heated in this manner into the granulate drier. The above was not possible in the prior art, because in the prior art only compressed air was blown in upstream of a circulation fan, and it was not provided that this air is also additionally heated. In the prior art, the air guided in the circuit was heated, whereas in the method according to the invention the scavenging air of the blow-molding process is introduced into the granulate drier, flows through the material to be dried, and leaves the drier at an outlet opening disposed at the upper end of the drier.

In a first embodiment of the present invention, a circulation process is omitted and simple, continuous operation is proposed for the drier.

In a modification of the first embodiment, it is provided that, in addition to bringing in drying air according to the above-mentioned method, an additional circuit is proposed for guiding additional drying air in the drier.

In the first-named, preferred embodiment, the drying air is guided through the drier in continuous operation, which is associated with the significant advantage of a low mechanical expense.

An additional drying-air circulation is only proposed in the second described embodiment, in which instance a fan is connected to the upper end of the drier by way of a corresponding line, which fan compresses the air removed from the drier and conducts it back to the floor region of the drier. This air conducted back to the floor region is then additionally heated, which is associated with the advantage that the entire granulate mass can be brought up to a required temperature quickly by means of this heating.

It is also important that the drying process be directly associated with the blow-molding process in such a way that the granulate must first be dried prior to the start of the blow-molding process in order to have available a dry granulate for the blow-molding process. This requires that a compressed-air current first be introduced directly into the drier, pre-drying the granulate. As soon as a portion of the granulate is dry, it can be conveyed into the extruder, which conducts the material into a parison shaping head, where the material is deformed into a plastic hose that is subsequently placed into the blow-molding mold. Not until after the above steps this does the blow-molding process itself commence, and the scavenging air resulting from the blow-molding process is used in order to operate the drier further in drying operations according to the method of the invention.

The present invention, therefore, focuses on the fact that the compressed air used for the blow-molding process can also be introduced directly into the drier in order to effect a partial drying, at least at the start of the drying process.

The invention is not limited to the use of scavenging air from an extrusion blow-molding process, as described above, but relates to the use of scavenging air from arbitrary plastic-molding processes, and particularly to the so-called stretch-blow process or other known plastic-molding processes.

In the present invention, it is important above all that the waste product of the plastic-deformation process, namely the scavenging air or blowing air used for plastic molding is used as drying air for a granulate drier.

The subject of the present invention not only ensues from the features described herein, and also from the combination of those features among themselves. All of the information and features disclosed in the documents, including the abstract, and particularly the spatial embodiment shown in the drawings, are essential to the invention, insofar as they are novel, either individually or in combination, with respect to the prior art.

The invention is described in detail below by way of a drawing showing only one embodiment. Further features which are essential to the invention and advantages of the invention ensue from the drawing and its description.

BRIEF DESCRIPTION OF THE DRAWING

A preferred embodiment of the method of the invention and a granulate drier operating in accordance therewith are shown schematically in the sole drawing.

DETAILED DESCRIPTION OF THE INVENTION

In the direction of arrow 19, compressed air 1.1 is fed into the line at the inlet of a supply network; the valve 5 is closed, and the valve 4 is open. This compressed air 1.1 passes through a preliminary filter 2.1 and enters a drier 2.2 via the line 1.2.

The compressed air 1.1 has a pressure approximately in a range between 5–12 bar.

If, on the other hand, the compressed air 1.1 is required for a stretch-blow process, then the pressure range is between 25–40 bar.

At the outlet of the drier 2.2, the air flows through a filter 2.3 via the line 1.3 in case the drier 2.2, for example configured as an absorption drier, has also delivered particles to the air flow, which particles are then removed from by the filter 2.3.

The compressed air 1.1, which has been dried, de-oiled and cleansed in this manner, passes via the line 1.4 through the open three-way valve 6 into a heating unit 2.4, where the pre-heated compressed air 1.1 is conducted through an outlet opening 1.7 via a line 1.6 into the floor region of the granulate funnel 3.1. The granulate drier 20 essentially comprises a thermally-insulated housing in which the materials 21 to be dried are disposed. The air exiting the outlet opening 1.7 in the direction of arrow 22 flows through the materials 21 to be dried and leaves the granulate drier 20 via an upper inlet opening 1.8.

In a way that is not explained in detail, the granulate to be dried is additionally removed from the supply reservoir in the direction of arrow 11 and supplied via the line 13 to a conveying device 12, which feeds the granulate to be dried into the granulate drier 20.

After drying has been effected for a time in the granulate drier 20, dry material can be removed from the granulate drier and supplied to the blow-molding process. The conveying lines necessary for this and the other devices are not illustrated. The blow-molding process is then begun with this material. The valve 6 is switched, so that the compressed-air current 1.1 is supplied to the blow mandrel 17 via the line 23 and introduced into the blow-molding mold as scavenging air 18. After leaving the blow-molding mold 16 via the blow mandrel 17, the scavenging air 18 obtained in this way is not released into the open air (the valve 7 is closed); rather, this scavenging air is supplied into the line 1.5 via the partially-opened throttle valve 8 and, when valve 9 is open, to the heating unit 2.4.

In the same manner as described above, this air can still be heated by the heating unit 2.4 and then blown into the floor region of the granulate drier 20 via the inlet opening 1.7 in the manner described above. This blowing is effected under a pressure slightly above atmospheric pressure.

In a modification of the present invention, an additional heating unit of the granulate drier is further provided in order to ensure that the granulate can be removed at a certain temperature of, for example, 170° C. at the outlet 24 of the granulate drier. For this purpose it is provided with its own heating circuit, which essentially comprises a line 1.9 connected to the top side of the granulate drier 20 and terminating into the housing upstream of a fan 3.2. The fan compresses air removed from the drier and conducts it via a line 14 to a heating unit 3.3, where this air is heated corresponding to the required granulate temperature, and then flows into the granulate via an outlet nozzle 1.10 and mixes with the scavenging air 18 from the outlet opening 1.7.

In a continuous heating circuit, this air is again removed via the line 15 and the fan 3.2 and brought back into the drier via the line 14 and the outlet nozzle 1.10.

It is therefore a feature of the present invention that the scavenging air 18 from the blow-molding process is used for introduction into the granulate drier 20.

I claim:

1. A method of operating a drier for at least one of powdered, granulated and pourable materials, comprising the steps of:

effecting a plastic molding of a mold material utilizing a plastic molding device;

drawing a drying air current from an outlet of the plastic molding device; and introducing the drying air current into a drier containing a material to be dried such that the drying air current passes through the material to be dried and removes moisture therefrom.

2. The method according to claim 1, wherein the step of introducing the drying air current includes the step of introducing the drying air current into a floor region of the drier such the drying air current rises through the material to be dried and removes moisture therefrom.

3. The method according to claim 2, wherein the step of introducing the drying air current includes the step of introducing the drying air current at a pressure slightly above atmospheric pressure.

4. The method according to claim 1, wherein the plastic molding device includes at least one of a blow-molding device and a stretch-blow-molding device.

5. The method according to claim 1, wherein:

the step of effecting a plastic molding of the mold material includes the step of effecting a blow molding of the mold material with scavenging air utilizing a blow-molding device; and the step of drawing the drying air current includes the step of drawing the scavenging air from the outlet of the blow-molding device.

6. The method according to claim 5, further including the step of preheating the scavenging air before the step of introducing.

7. The method according to claim 1, further including the step of circulating the drying air current through the drier in a continuous operation.

8. The method according to claim 1, further including the step of conducting at least part of the drying air current back into the drier after the drying air current has passed through the material to be dried.

9. The method according to claim 1, wherein the plastic molding device is a blow-molding device, the method further including the steps of:

drying the material to be dried in the drier before the step of effecting the plastic molding thereby generating dried material;

supplying the dried material as mold material to the blow-molding device before the step of effecting the plastic molding; and wherein the step of effecting a plastic molding of the mold material includes the step of deforming the mold material with scavenging air utilizing the blow-molding device, and wherein the step of introducing includes the step of conducting the scavenging air into the drier in order to dry further material.

10. A device for performing the method according to claim 1, comprising:

a plastic molding device;

a drier operatively connected with the plastic molding device;

a heating unit operatively connected with the plastic molding device and the drier; and a line connected to and in flow communication with the plastic molding device, the heating unit and the drier for guiding the scavenging air from the blow molding device through the heating unit and into the drier.

11. The device according to claim 10, wherein the plastic molding device is a blow mandrel.

12. The device according to claim 10, wherein the drier is a drying funnel.

13. The device according to claim 10, further comprising a heating circuit including:

a line connected to and in flow communication with the drier for drawing from the drier drying air which has passed through the material to be dried, and for supplying the drying air back into the drier; and a fan being in flow communication with the line such that the drying air drawn from the drier passes through the fan before it is supplied back into the drier.

14. The device according to claim 10, wherein the heating circuit further includes:

an electrical heating unit in flow communication with the line for heating the drying air before it is supplied back into the drier; and an outlet nozzle in flow communication with the line, the line supplying the drying air back into the drier through the outlet nozzle.

* * * * *